United States Patent

[11] 3,591,988

[72] Inventor Ralph E. Price
 Waynesboro, Pa.
[21] Appl. No. 839,924
[22] Filed July 8, 1969
[45] Patented July 13, 1971
[73] Assignee Litton Industries, Inc.
 Beverly Hills, Calif.

[54] WORK REST
 29 Claims, 11 Drawing Figs.
[52] U.S. Cl. .................................................. 51/105,
 51/238
[51] Int. Cl. ..................................... B24b 5/00,
 B24b 17/00
[50] Field of Search .......................................... 51/105,
 238.1, 238

[56] References Cited
 UNITED STATES PATENTS
1,465,534 8/1923 Turner ........................ 51/238.1
3,330,074 7/1967 Stuckey ....................... 51/105
3,391,500 7/1968 Messier ....................... 51/238.1

Primary Examiner—William R. Armstrong
Attorney—Diller, Brown, Ramik and Holt ABSTRACT: This disclosure relates to a work rest for machine tools, and more particularly, for grinding machines, the work rest includes a base member having a work supporting member pivotally mounted thereon. The work supporting member has angularly spaced shoe portions for supporting a workpiece. The work supporting member is secured to the base member by an inner eccentric shaft adjacent to the work shoe. A second eccentric shaft at the outer portion of the work supporting member secures the work supporting member to a yoke which, in turn, is pivotally connected to the base member through a shaft. Adjustment of the inner eccentric shaft moves the support member in a near-vertical direction, and adjustment of the eccentric at the outer portion of the work supporting member moves the work supporting member in a near-vertical direction. A manually or hydraulically operated shoe mechanism may be included as an integral part of the work rest to control the specific work supporting requirements when large diameters are to be ground or when more than one work rest is required.

INVENTOR
RALPH E. PRICE
By Diller, Brown, Ramik & Holt
ATTORNEYS

WORK REST

This invention relates in general to an improved work rest for machine tools and, more particularly, to a work rest for cylindrical grinding machines. The work rest is particularly suitable for supporting portions of a workpiece other than the portion being ground, such as the main bearing diameters of an automotive camshaft.

It is to be particularly noted that on machines of this type, it is necessary to provide a work rest which, when properly adjusted and locked, supports the workpiece to maintain maximum roundness of the portion being ground without requiring further adjustment after the initial machine setup.

Prior to this invention, work rests for such machines were comprised of a work support member pivotally mounted on a base member of a work support by a single eccentric shaft to effect movement toward and away from the workpiece. The support member was held against an angular wedge by spring pressure and from the weight of the workpiece. Work rest shoe adjustment was effected through a compressed spring and a tapered wedge to provide an angular surface to raise and lower the work support member. This type of work rest has proven to be unsatisfactory as the original setup and further adjustments are difficult to obtain. The work rest shoes were under tension and dirt from contaminated coolant collected on the wedge members which had to be cleaned before an accurate adjustment could be made. This work rest was inaccurate if bumped or jarred as dirt would collect on the tapered wedge to produce an out-of-round shaft.

In view of the foregoing, it is, therefore, a primary object of this invention to provide means to improve the accuracy of adjustment for the near-vertical and horizontal movement of the work supporting member.

Another object of this invention is to provide a work rest of a construction which will insure uniform pressure on the work engaging shoe portions which support the workpiece.

Still another object of this invention is to provide a stable work rest which, when properly adjusted and locked in place, supports the workpiece without further adjustment.

A further object of this invention is to provide a work rest which includes a support member carrying a workshoe, and the support member being mounted relative to a base member partially directly on a pivot and partially indirectly through a pivotally mounted yoke wherein a triangular support arrangement is provided and wherein the workshoe may be adjusted by changing the position of one or more of the pivots.

Still another object of this invention is to provide a work rest which obtains a solid contact between the workpiece and the raised concave portions of the work shoe, the concave portions being designed to support a workpiece with at least two angularly spaced portions and means removably supported on the work support member.

A further object of this invention is to provide locking screws to insure that the adjustment of the work support members are completely stable, so that coolant contamination will not affect the settings if the work shoe should be bumped or jarred.

A still further object of this invention is to provide the work rest with a manually or hydraulically operated upper shoe mechanism which functions as an integral part of the work rest and which includes an upper shoe which opposes the workshoe portions and is selectively brought into spring loaded engagement with the workpiece so as to firmly seat the workpiece on the shoe portions of the work rest.

With the above, and other objects in view that will hereinafter appear, the nature of the invention will be more clearly understood by reference to the following detailed description, the appended claims and the several views illustrated in the accompanying drawings.

Figure 1:
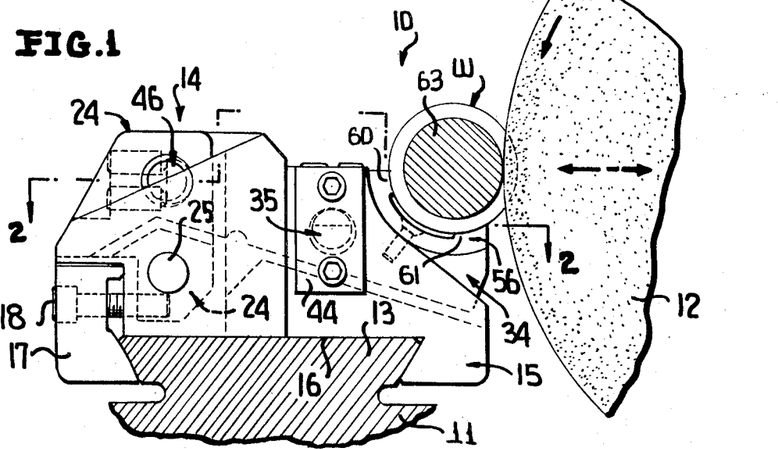
FIG. 1 is a fragmentary transverse sectional view taken through a grinding machine and shows the work rest in elevation supporting a workpiece being ground.

Referring now to the drawings in detail, it will be seen that there is illustrated in FIG. 1 basic components of a grinding machine which is generally identified by the numeral 10. The grinding machine 10 includes a table 11 on which suitable supports (not shown) are mounted for supporting a workpiece, such as the workpiece W for rotation about a predetermined axis. The grinding machine 10 also includes a grinding wheel 12 which is supported in the customary manner for rotation and for advancing and retracting movement relative to the workpiece W. Since the invention is not restricted to any specific features of the grinding machine 10 except the foregoing, and since the grinding machine 10 may otherwise be of a conventional construction, no attempt is being made here to further disclose the details of the grinding machine except as to those components which specifically relate to the supporting of the workpiece W.

As is clearly shown in FIG. 1, the table 11 is provided with a guide 13 which extends longitudinally of the grinding machine 10. A work rest, which is formed in accordance with this invention and which is generally identified by the numeral 14, is mounted on the guide 13 and is adapted to be fixedly, but releasably, secured thereto in a longitudinally adjusted position for backing up and supporting the workpiece W during a grinding operation thereon.

The work rest 14 includes a base member, which is generally identified by the numeral 15. The base member 15 has a lower portion thereof configurated to define a seat 16 contoured to match the guide 13, as is clearly shown in FIG. 1. The base member 15 is further provided with a clamp member 17 which is adjustably secured to the base member 15 by means of a pair of fasteners 18 which serve to selectively position the clamp member 17 so that it tightly clamps against the guide 13 in the manner shown in FIG. 1 so as to lock the base member 15 in a longitudinally adjusted position on the guide 13.

Figure 2:
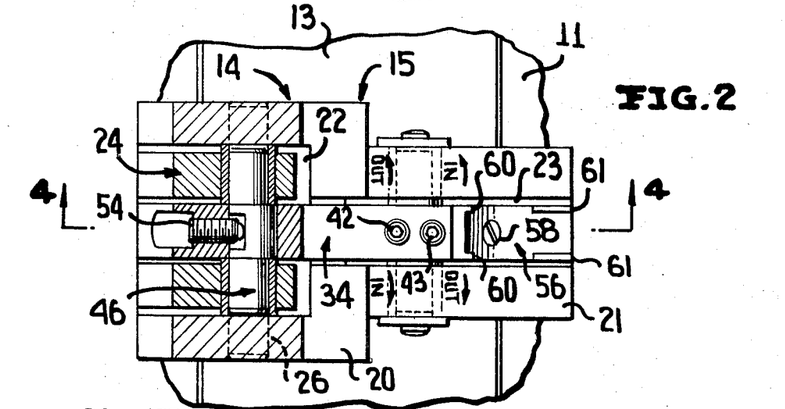
FIG. 2 is a fragmentary horizontal sectional view taken along the line 2-2 of FIG. 1 and shows specifically the details of construction of the work rest.
Figure 5:
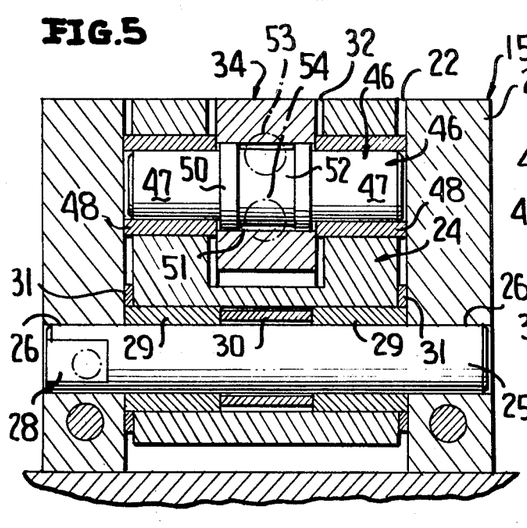
FIG. 5 is a fragmentary vertical sectional view taken along the line 5-5 of FIG. 4.
Figure 6:
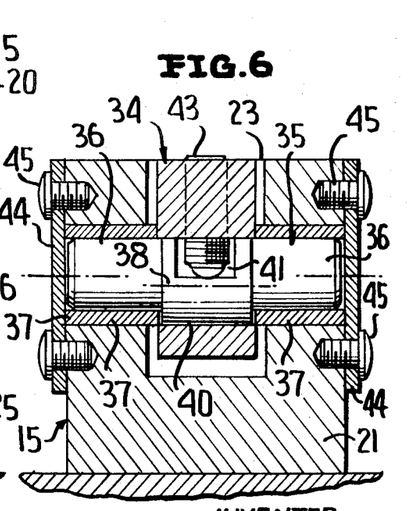
FIG. 6 is a fragmentary vertical sectional view taken along the line 6-6 of FIG. 4.

As is clearly shown in FIG. 2, the base member 15 has a wide front portion 20 and a narrow rear portion 21 with the base member being generally U-shaped in section longitudinally of the grinding machine 10, as is best shown in FIGS. 5 and 6. As a result of the U-shaped configuration, the front portion 20 of the base member 15 is provided with a relatively wide front socket 22 while the rear portion 21 is provided with a narrow rear socket 23 which is centered relative to the front socket 22 transversely of the grinding machine 10. It is also to be noted that the rear socket 23 extends through a rear part of the front portion 20 and opens into the front socket 22.

A yoke, which is generally identified by the numeral 24, is pivotally mounted within the front socket 22 for pivotal movement about a shaft 25 which extends longitudinally of the grinding machine 10. The shaft 25 has end portions thereof firmly pressed into bores 26 in the front portion of the base 15 (FIG. 5) with the shaft or pivot pin 25 being anchored in place by means of a setscrew 27 (FIG. 4) engaging a flat 28 thereon.

The yoke 24 is pivotally mounted on the pivot pin 25 by means of a pair of bushings 29 mounted in the opposite side portions thereof and separated by means of a spacer 30. The bushings 29 project beyond the opposite side surfaces of the yoke 24 and carry spacers 31 which center the yoke 24 within the socket 22 and space the sides of the yoke 24 from the surfaces of the base member 15.

At this time it is pointed out that the yoke 24 is free to pivot about the pivot pin or shaft 25.

At this time it is also to be noted that the yoke 24 is of a U-shaped section, as is shown in FIG. 5, and is provided with a socket 32 therein which is aligned with and is of the same width as the socket 23.

The yoke 24 is pivotally mounted on the pivot pin 25 by means of a pair of bushings 29 mounted in the opposite side portions thereof and separated by means of a spacer 30. The bushings 29 project beyond the opposite side surfaces of the yoke 24 and carry spacers 31 which center the yoke 24 within the socket 22 and space the sides of the yoke 24 from the surfaces of the base member 15.

At this time it is pointed out that the yoke 24 is free to pivot about the pivot pin or shaft 25.

At this time it is also to be noted that the yoke 24 is of a U-shaped section, as is shown in FIG. 5, and is provided with a socket 32 therein which is aligned with and is of the same width as the socket 23.

The work rest 14 also includes a support member 34 which is positioned in both the socket 32 and the socket 23. Further, the support member 34 is pivotally connected to both the yoke 24 and the base member 15.

The support member 34 is connected to the base member 15 by means of a pivot pin or shaft 35 which has end portions 36 rotatably journaled in bushings 37 carried by the narrow portion 21 of the base member 15. The bushings 37 project into the socket 23 at the opposite sides of the support member 34 so as to center the support member 34 within the socket 23.

The shaft 35 also includes an eccentric central portion 38 which is rotatably journaled in a bore 40 formed in the support member 34. It is to be noted that the eccentric portion 38 is centrally recessed as at 41 and is engaged by means of a positioning screws 42, 43 carried by the support member 34 and engaging the eccentric portion 38 in radial offcenter relation, as is clearly shown in FIG. 4. It will be readily apparent that relative rotation between the support member 34 and the shaft 35 may be accomplished by suitably rotating the positioning screws 42 and 43.

The shaft 35 is maintained in place and is sealed at the sides of the base member 15 by a pair of plates 44 which are releasably secured in place by means of fasteners 45. It is to be noted that the plates 44 enclose the ends of the shaft 35 and the bushings 37.

The support member 34 is also secured to the yoke 24 by means of a pivot pin or shaft which is generally identified by the numeral 46. The shaft 46, like the shaft 35, is an eccentric shaft and, as is best shown in FIG. 5, has end portions 47 which are mounted within bushings 48 for limited rotational movement. The bushings 48 are of sufficient length so as to aid in the centering of the yoke 24 within the socket 22 and at the same time being effective to center the support member 34 within the socket 32.

Figure 4:
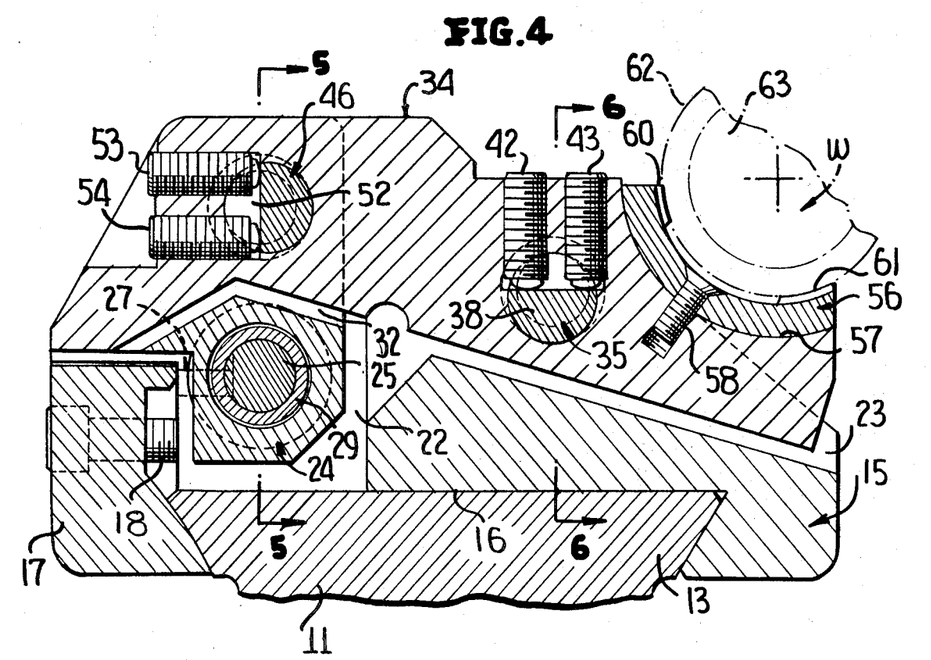
FIG. 4 is an enlarged vertical sectional view taken along the line 4-4 of FIG. 2 and shows specifically the details of construction and adjustment of the work rest.

It is also to be noted that the shaft 46 includes an eccentric central portion 50 which is positioned within a bore 51 formed in the support member 34. The eccentric portion 50 is provided with a centrally located recess 52 in which are positioned ends of adjusting screws 53, 54, as is best shown in FIG. 4. The adjusting screws 53, 54, are horizontally disposed and engage the eccentric shaft 46 in an offcenter relation so as to facilitate limited relative rotary movement between the shaft 46 and the support member 34 for adjusting the support member 34 horizontally.

The work rest 14 also includes a workshoe which is secured to an upper rear portion of the support member 34 for ready replacement. The workshoe, which is generally identified by the numeral 56, is secured on a seat 57 formed on the support member 34 by means of at least one fastener 58. The workshoe 56 carries angularly spaced curved portions 60 and 61 which may be brought into direct engagement with a cylindrical portion 62 of the workpiece W other than portion 63 being ground by the grinding wheel 12.

At this time it is particularly pointed out that the various bushings 29, 37 and 48, as well as the spacers 31, serve to protect the various shafts from coolant contamination and other contaminations.

OPERATION

It is to be noted that the base member 15, the yoke 24 and the support member 34 are connected through the hinge and pivotable movements provided by shafts 25, 46 and 35. It will be seen that when the shaft 46 is rotated through adjustment of screws 53 and 54, the support member 34 will pivot about the shaft 35 which moves the workshoe 56 in a near vertical direction as shaft 25 pivots as a hinge member. The movement of the work shoe 56 upon turning of the adjusting screws 53 and 54, is clearly defined by the illustration of FIGS. 3 and 4.

It will be seen that when the pivot shaft 35 is rotated by adjusting the screws 42, 43, the support member 34 will be pivoted about the shaft 25 so as to shift the workshoe 56 in a near-horizontal direction, as shaft 46 pivots as a hinge member. The relative movement of the workshoe 56 upon adjustment of the screws 42, 43 is clearly defined in the illustration found in FIGS. 2 and 4.

It is to be understood that the work rest 14 must be properly adjusted to obtain a solid contact between the workpiece W and the portions 60, 61 of the workshoe 56 to maintain maximum roundness (or a true contour) of the portion being ground.

Figure 3:
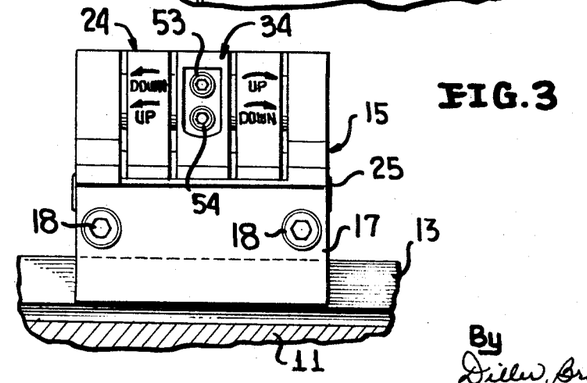
FIG. 3 is a front elevational view of the work rest.

As is shown in FIGS. 3 and 4, the workshoe 56 is adjusted upwardly by retracting the screw 54 and advancing the screw 53 which will turn the eccentric pivot shaft 46 clockwise to effect relative pivotal movement of the support member 34 about the shaft 35. The workshoe 56 is adjusted downwardly by turning the screws 53, 54 in the opposite direction and sequence.

The workshoe 56 is adjusted inwardly by retracting the adjusting screw 42 and then advancing the adjusting screw 43 which turns the eccentric shaft 35 clockwise to effect relative pivotal movement of the support member 34 about the shaft 25. The workshoe 56 is adjusted outwardly by turning the adjusting screws 42 and 43 in the opposite direction and sequence.

It will be readily apparent that one the position of the workshoe 56 is adjusted and the adjusting screws are locked in place, there can be no relative movement of the workshoe 56 with respect to the base member 15.

At this time it is pointed out that although the adjusting screws 53 and 54 have been illustrated as being horizontally disposed, they may equally as well extend through the top of the support member 34 and be vertically disposed. Thus, all adjustments of the workshoe 56 may be made from the top of the work rest 14.

UPPER SHOE MECHANISM

The work rest of FIGS. 1 through 6, if desired, may be furnished with an upper shoe mechanism, as is shown in FIGS. 7 through 10. The upper shoe mechanism provides continuous force to steady the workpiece against the lower work rest shoe 56 and is extremely useful when a large diameter workpiece is being ground or when a workpiece requires more than one work rest.

The upper shoe mechanism will enable workpieces to be accurately ground as the combined forces between the upper and lower shoes will straighten the workpieces by maintaining constant pressure against the diameters of the workpieces being clamped.

Runout will be prevented as the force exerted by the grinding wheel or other machine tool will not be able to raise the workpiece out of the lower workshoe or shoes 56.

The upper shoe mechanism, when suitably constructed, will also provide a safety cover to prevent the making of unauthorized vertical and horizontal adjustments of the lower workshoe 56 through the eccentric shafts 35 and 46. It is pointed out here that these adjustments should not be required after the initial set up for a particular group of workpieces.

MANUALLY OPERATED MECHANISM

Figures 7, 8, 9:
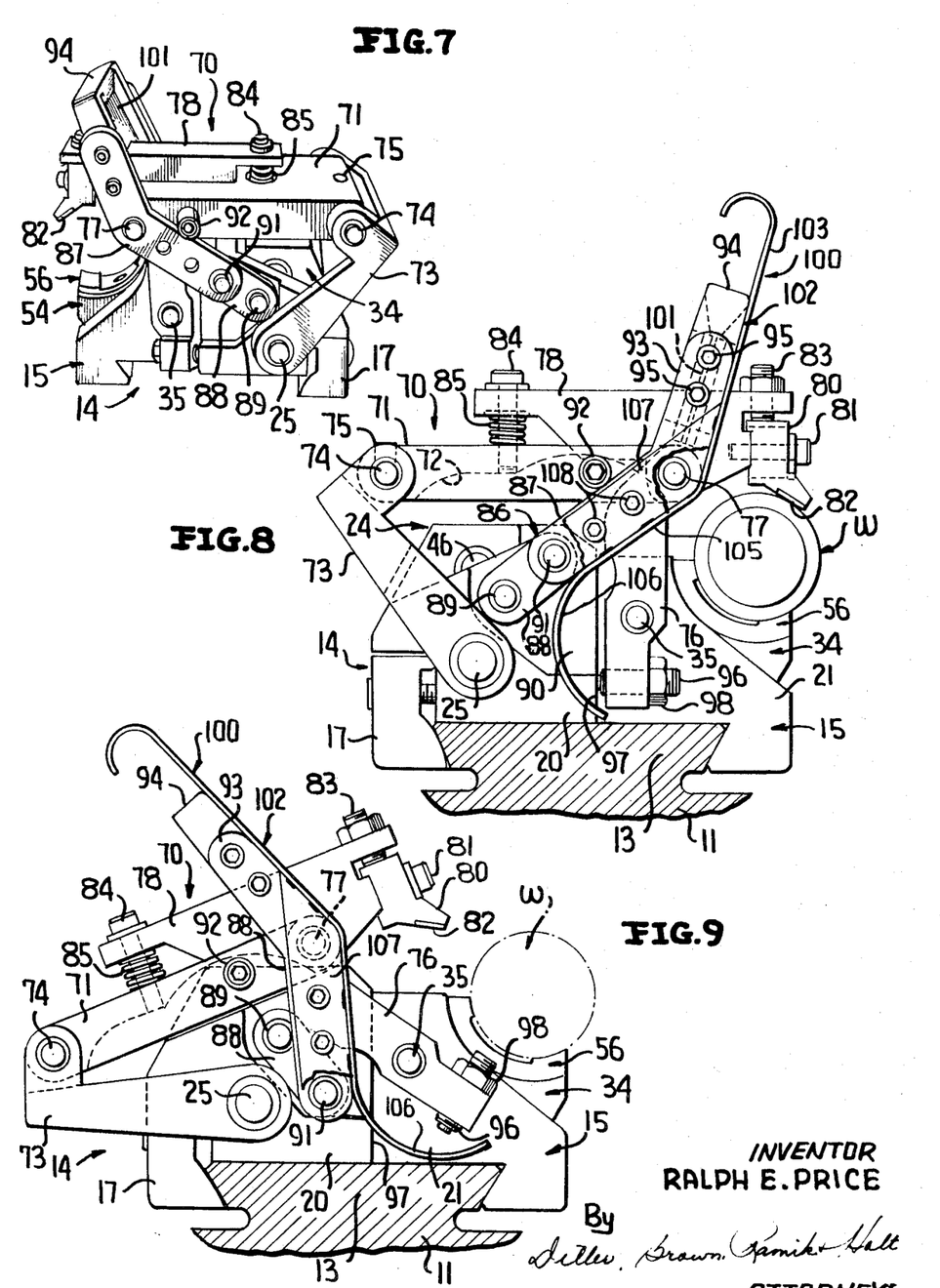
FIG. 7 is a top side perspective view of the work rest having mounted thereon a manually operated upper shoe mechanism.
FIG. 8 is a side elevational view of the work rest of FIG. 7 from the opposite side and shows the same in an operative condition.
FIG. 9 is a side elevational view similar to FIG. 8 and shows the upper shoe mechanism in its released condition.

In FIGS. 7, 8 and 9 the work rest 14 is illustrated as having incorporated as part thereof a manually operated upper shoe mechanism which is generally identified by the numeral 70. The upper shoe mechanism 70 includes a cradle 71 which is horizontally disposed in the operative position thereof, as is shown in FIG. 8, and overlies the base member 15, the yoke 24 and the support member 34. The cradle 71 is generally in the form of a rectangular plate having the underside thereof skeletonized or cut away as at 72 to provide clearance for both the yoke 24 and the support member 34.

The front end of the cradle 71 is mounted for swinging movement by means of a cradle support or link 73 which is of generally inverted U-shape to span opposite sides of the front portion 20 of the base member 15. The link 73 is pivotally mounted on the extended ends of the pivot shaft 25 and has the upper portion thereof pivotally connected to the cradle 71 by means of a horizontal pivot shaft 74 which is carried by the rear portion of the cradle 71 and which is fixedly secured in place in the cradle by means of a setscrew 75.

The rear end of the cradle 71 is mounted for swinging movement by means of a pair of generally L-shaped pivot arms or links 76 which are disposed on opposite sides of the rear portion 21 of the base member 15 and which are pivotally mounted on the extensions of the eccentric shaft 35. The upper ends of the links 76 are pivotally connected to opposite sides of the rear end portion of the cradle 71 by means of a horizontal pivot shaft 77 carried by the cradle 71.

It will be readily apparent from a comparison of FIGS. 8 and 9 that the cradle 71 is supported by the links 73 and 76 for swinging movement between a generally horizontal operative position and a downwardly and forwardly sloping forward retracted position.

The rear part of the cradle 71 is notched out to receive a lower intermediate part of a shoe support 78 which is pivotally mounted on the pivot shaft 77. The rear end of the shoe support 78 has secured thereto a carrier 80 by means of a fastener 81. The carrier 80, in turn, carries upper shoe 82 which generally opposes the lower workshoe 56. The carrier 80 and the upper shoe 82 are vertically adjusted by means of a positioning screw 83.

The forward end of the shoe support 78 is anchored relative to the cradle 71 by means of a vertically disposed fastener 84 which extends therethrough and is threaded into the upper surface of the cradle 71. A spring 85 surrounds the fastener 84 intermediate the cradle 71 and the shoe support 78 and constantly urges the forward end of the shoe support 78 upwardly as far as is permitted by the fastener 84, thereby urging the upper shoe 82 downwardly. It will be readily apparent that the upper shoe 82 is upwardly movable a limited about through the pivoting of the shoe support 78 and the compressing of the spring 85.

The cradle 71, the carrier 80 and the upper shoe 82 carried thereby are manually movable between retracted and operative positions and are locked in the operative position thereof by means of an overcenter linkage which is generally identified by the numeral 86. The linkage 86 includes a link 87 disposed on each side of the work rest 14 and pivotally mounted on an extension of the pivot shaft 77. The overcenter linkage 86 at each side of the work rest 14 also includes a lower link 88 which is mounted on a pivot 89 carried by the front portion 20 of the base member 15. At this time, it is pointed out that outer surface parts of the front portion 20 are cut away, as at 90, to provide clearance for the links 88.

The links 87 and 88 at each side of the work rest 14 are connected together by a pivot pin 91. It will be seen from FIG. 8 that when the cradle 71 is brought to a generally horizontal position with the upper shoe 82 in pressure contact with the workpiece W, the pivots 77, 89 91 will assume an in-line relationship. However, in order to lock the cradle 71 in its operative position the pivot pin 91 at each side of the work rest 14 is swung above the line extending between the pivots 77 and 89 so that the links 87 and 88 move to an overcenter position.

In order that the movement of the links 87 and 88 to their overcenter positions may be limited, a stop member 92 is mounted on each side of the cradle 71 for engaging the links 87. Thus, it will be readily apparent that when the cradle 71 is brought to its operative position by a snap action which brings the links 87 and 88 and the pivots 91 to their overcenter positions, the cradle 71 will be locked in place since considerable force is required to move the links 87 and 88 back past their overcenter positions and they cannot move further beyond their overcenter positions due to the engagement of the links 87 with the stop members 92.

In order to facilitate the positioning of the cradle 71 and the upper shoe 82, the links 87 are generally L-shaped in outline and include upper extensions 93 between which a handle 94 is positioned. The handle 94 is secured in place by means of suitable fasteners 95. It will be readily apparent that since the handle is directly coupled to the links 87, the handle 94 may be utilized in swinging the links 87 and 88 from their folded relationship of FIG. 9 to their lightly overcenter relationship of FIG. 8 so as to move the cradle 71 and the upper shoe 82 from their retracted position to their operative position.

It is further pointed out that the links or pivot arms 76 include conventional means to limit the movement of the cradle 71 to the right, as viewed in FIG. 9. These means include an adjustable stop screw 96 which extends through a lower extension of each link 76 and which is engaged with an abutment surface 97 which exists between the portions 20 and 21 of the base member 15. The screw 96 is locked in adjusted position by means of a locknut 98.

OPERATION OF MANUALLY OPERATED MECHANISM

It will be readily apparent from FIGS. 8 and 9 that movement of the upper shoe mechanism 70 is effected by moving the handle 94 clockwise. The pivot arms 76 will pivot about the eccentric shaft 35 while the cradle support 73 will picot about the pivot shaft 25. The cradle 71, the shoe support 78 and the upper shoe 82 will be advanced as a unit about an arc controlled by the cradle support 73 and the pivot arms 76 until the pivot arms 76 reach a solid stop against the base member 15. The handle 94 is pivoted until the links 87 reach a solid stop against the stop members 92 at which time the links 87 and 88 are in offcenter toggle relation to lock the handle 94 in its most advanced position in a clockwise direction.

The upper shoe mechanism 70 is retracted by counterclockwise movement of the handle 94. The links 88 are pivoted clockwise about the pivot pins 89 and the pivot arms 76 are pivoted counterclockwise about the eccentric shaft 35 to effect movement of the cradle 71, the shoe support 78 and the upper shoe 82, to the left which pivots the cradle support 73 counterclockwise to the position shown in FIG. 9. Counterclockwise movement of the handle 94 is continued until the pivot arms 76 contact the links 88. This movement permits ample space to remove the workpiece W from the work rest 14.

SPRAY GUARD

It has been found desirable to provide a spray guard for the work rest 14. The purpose of the spray guard is to protect the operator from the coolant spray during the grinding operation by confining the spray from the coolant to a small area. The spray guard is generally identified by the numeral 100 and is actually formed in three pieces.

The spray guard 100 includes a central portion 101 which is mounted within the handle 94 and extends down around the shoe support 78 to a position closely overlying the cradle 71.

The spray guard 100 also includes two outer sections, each of which is carried by one of the links 87. The spray guard outer sections are each identified by the numeral 102 and includes an upper portion 103 which is disposed just to the right of the handle 94 (FIG. 8) and terminates in a downwardly turned upper curl 104. A lower portion 105 of the outer spray guard sections 102 is integrally connected to the upper portion 103 and extends generally alongside the lower edge of the associated link 87. The lower portion 105 terminates in a lower curl 106.

It is to be noted that the outer sections 102 of the spray guard are secured as by welding to a mounting plate 107 which, in turn, is removably secured to the associated link 87 by means of fasteners 108. The outer spray guard sections 102 may extend in cantilever relation from the links 87.

As is best shown in FIG. 9, inasmuch as the spray guard 100 is carried by the handle 94 and the links 87 to which the handle 94 is secured, when the upper shoe mechanism 70 is moved to a retracted position, the spray guard 100 is also moved to a retracted position relative to a workpiece W so as to facilitate the removal of the workpiece.

HYDRAULICALLY OPERATED MECHANISM

Figure 10:
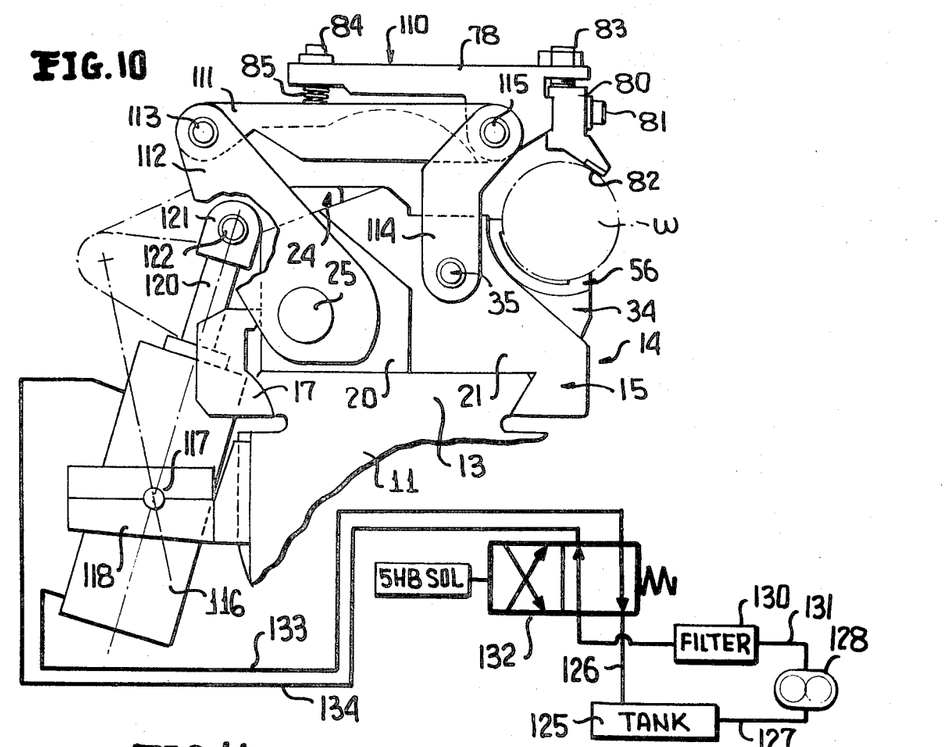
FIG. 10 is an elevational view of a hydraulically operated modification of the upper shoe mechanism including a schematic of the hydraulic system therefor.

Referring now to FIG. 10 in particular, it will be seen that the work rest 14 has been modified to include a hydraulically operated upper shoe mechanism which is generally referred to by the numeral 110. The construction of the upper shoe mechanism 110 is basically the same as that of the upper shoe mechanism 70 and includes a cradle 111 which overlies the base member 15, the yoke 24 and the support member 34 in its operative position. The front end of the cradle 111 is supported by a pair of support arms or links 112 which are disposed on opposite sides of the base member 15 and are pivotally mounted on extensions of the pivot shaft 25. The upper ends of the support arms 112 are pivotally connected to the left end of the cradle 111 by means of a pivot shaft 113.

The rear end of the cradle 111 is supported by a pair of support arms or links 114 which are disposed on opposite sides of the portion 21 of the base member 15 and have their lower ends pivotally mounted on extensions of the eccentric shaft 35. The links 114 are angular in outline and have their upper ends pivotally connected to opposite sides of the cradle 111 by means of a pivot shaft 115. At this time it is pointed out that upper parts of the portion 20 of the base member 15 are cut away to provide clearance for the links 114. In the same manner, parts of the underside of the cradle 111 are cut away to provide clearance for both the base member 15 and the yoke 24.

The cradle 111 has mounted thereon the shoe support 78 with the shoe support being pivotally mounted on the pivot shaft 115. The upper shoe 82 is carried by the carrier 80 and secured to the shoe support 78 in the manner described with respect to the manually operated mechanism.

In lieu of being manually movably between its operative position of FIG. 10 and a retracted position (not shown) the upper shoe mechanism 110 is hydraulically operated. To this end, there is provided a hydraulic cylinder 116 which is disposed alongside the table 11 and is mounted by means of trunnions 117 from a support bracket 118. The hydraulic cylinder 116 includes a piston rod 120 which is provided at the free end thereof with a fitting 121. The fitting 121, in turn, carries a pivot pin 122 which is utilized to connect the piston rod 120 to the support links 112 to effect the pivoting thereof about the axis of the pivot shaft 25.

It is pointed out that the work rest 14 is adjustable on the table 11 for alignment of the shoes 56 and 82 with a workpiece journal. To this end, the hydraulic cylinder 116 must also be adjustably mounted. It is to be understood that it is adjustable within limits relative to the support bracket 118. Furthermore, the support bracket 118 may be adjustably secured to the table 11 in any desired manner. For example, the support bracket 118 may be secured to the table 11 by a plurality of bolts (not shown) which are selectively positioned in threaded bores formed in the table 11. On the other hand, the sides of the table 11 could be provided with a T-slot to facilitate the adjustable mounting of the mounting bracket 118. In view of the fact that the specific attachment of the mounting bracket 118 to the table 11 is not an inventive part of the mechanism, no attempt will be made to further describe the adjustable mounting thereof.

Movement of the upper shoe mechanism 110 to its operative position is effected when hydraulic pressure is directed to the head end of the hydraulic cylinder or motor 116. The piston rod 120 projects from the cylinder and pivots the support arms or links 112 in a clockwise direction to both advance and tilt the cradle 111 and the shoe support 78 until the upper shoe 82 engages and clamps the workpiece W against the lower fork shoe 56.

The workpiece W remains clamped between the shoes 56 and 82 until hydraulic pressure is directed to the rod end of the cylinder 116 which lowers or retracts the piston rod 120, thereby effecting the counterclockwise swinging of the support arms 112. The counterclockwise movement of the support arms 112 retracts the cradle 111, the shoe support 78 and the upper shoe 82.

It is also pointed out at this time that although no spray guard has been illustrated in conjunction with the hydraulically operated upper shoe mechanism, a spray guard similar to the spray guard 100 may be provided. Such a spray guard may be conveniently mounted on the arms 114 for swinging movement between operative and inoperative positions in a manner similar to that described with respect to the spray guard 100.

OPERATION OF HYDRAULICALLY OPERATED MECHANISM

Figure 11:
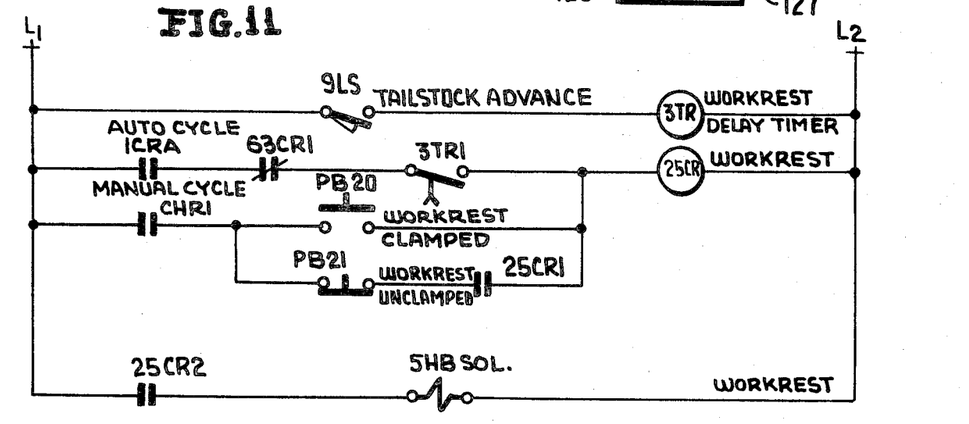
FIG. 11 is a wiring diagram for effecting the automatic operation of the hydraulically operated upper shoe mechanism.

With particular reference to FIGS. 10 and 11, it is to be understood that the upper shoe mechanism 110 may be operated either automatically or by manual pushbutton controls.

During the automatic operation, limit switch 9LS is closed when the tailstock (not shown) of the grinding machine is completely advanced to energize timer relay 3TR. Contact 3TR1 closes after a timed interval to complete a circuit through contact 1CRA, which is closed when the operation is set for the automatic cycle, and normally closed contact 63Cr1 to energize the work rest relay 25CR. Contact 25CR1 closes together with contact 25CR2 which closes to energize the work rest solenoid 5HB SOL.

It is to be noted that the hydraulic system for the cylinder 116 includes a supply tank 125 having connected thereto a return line 126 and a supply line 127 which, in turn, is connected to a pump 128. The pump 128 delivers pneumatic or hydraulic fluid under pressure through a filter 130 incorporated in a line 131. The lines 126 and 131 are connected to a two-position valve 132.

The hydraulic system also includes a line 133 which is coupled to the head end of the cylinder 116 and to the valve 132. A line 134 extends between the rod end of the cylinder 116 and the valve 132.

The valve 132 is spring loaded to the left in which position the pump 128 is normally connected to the rod end of the cylinder 116 retaining the upper shoe mechanism 110 in a retracted position. When the solenoid 5HB SOL is energized, the valve 132 is shifted to the right, connecting the pump 128 to the head end of the cylinder 116 and effecting the advance of the piston rod 120 to pivot the support arms 112 and links 114 in a clockwise direction to position the cradle 111 and the shoe support 78 so that the upper shoe 82 is resiliently forced and held against the workpiece W by hydraulic pressure.

It is to be noted that when the hydraulic cylinder 116 is actuated, fluid from the rod end of the hydraulic cylinder 116 is directed by means of the line 134 through the valve 132 and back through the return line 126 to the tank 125.

The workpiece W remains clamped between the shoes 56 and 82 until the grinding cycle is complete at which time a limit switch (not shown) is closed to energize end of cycle relay 63CR (not shown). The normally closed contact 63CR1 now opens to deenergize relay 25CR. Contact 25CR2 opens to deenergize solenoid 5HB SOL with the result that the valve 132 is again shifted to the left by the spring thereof and hydraulic fluid is directed through line 134 to the rod end of the hydraulic cylinder 116. The piston rod 120 is then lowered or retracted to pivot the arms 112 and links 114 in a counterclockwise direction to retract the cradle 111, shoe support 78 and upper shoe 82 away from the workpiece.

The hydraulic operation of the upper shoe mechanism 110 is duplicated during the manual operation thereof when the cycle is effected by depressing pushbutton PB20 to complete a circuit through contact CHR1, which is closed by manual cycle operation, to energize relay 25CR. Contact 25CR2 closes to energize work rest solenoid 5HB SOL which shifts valve 132 to the right to effect the positioning of the upper shoe 82 against the workpiece in the previously discussed manner.

At this time it is pointed out that when relay 25CR is energized, a holding circuit is completed through contact CHR1, pushbutton PB21 and contact 25CR1 to keep relay 25CR energized when pushbutton PB20 is released. It is also to be understood that pushbutton PB21 is normally closed.

When it is desired to retract the upper shoe 82 to remove a workpiece, pushbutton PB21 is depressed, opening the circuit to relay 25CR. When relay 25CR is deenergized, contact 25CR2 opens to deenergize the solenoid 5HB SOL, permitting the valve 132 to return to its normal position wherein the piston rod 120 is retracted to retract the cradle 111.

Although only preferred embodiments of the work rest have been specifically illustrated and described herein, it is to be understood that other minor modifications may be made in the work rest structure without departing from the spirit of the invention.

I claim:
1. A work rest for a machine tool, said work rest comprising
 a. a base member, a yoke,
 b. a first pivot pivotally connecting said yoke to said base member,
 c. a support member,
 d. second and third pivots connecting said support member to said yoke and to said base member, respectively,
 e. a work shoe carried by said support member,
 f. and at least one of said pivots being adjustable to effect a controlled shifting of said support member relative to said base member for positioning said work shoe.
2. The work rest of claim 1 wherein
 a. said at least one adjustable pivot is of the eccentric type.
3. The work rest of claim 1 wherein
 a. said at least one adjustable pivot is of the eccentric type,
 b. and means for selectively rotationally positioning said at least one adjustable pivot including,
 c. a pair of counteracting screws in radial offcenter engagement with said at least one adjustable pivot.
4. The work rest of claim 1 wherein
 a. two of said pivots are adjustable,
 b. one of said adjustable pivots effecting primarily horizontal movement of said work shoe, and
 c. the other of said adjustable pivots effecting primarily vertical movement of said work shoe.
5. The work rest of claim 1 wherein
 a. two of said pivots are adjustable,
 b. one of said adjustable pivots effecting primarily horizontal movement of said work shoe, and
 c. the other of said adjustable pivots effecting primarily vertical movement of said work shoe,
 d. said one adjustable pivot being displaced primarily horizontally with respect to the third pivot of said three pivots, and
 e. said other adjustable pivot being displaced primarily vertically with respect to said third pivot.
6. The work rest of claim 5 wherein
 a. said one adjustable pivot is said pivot between said support member and said base member, and
 b. said other adjustable pivot is said pivot between said support member and said yoke.
7. The work rest of claim 1 wherein
 a. said work rest is particularly adapted to support a rotating workpiece, and
 b. said work shoe includes angularly spaced end portions which are raised and curved to support the workpiece and are replaceable in accordance with the workpiece contour to properly support a workpiece.
8. The work rest of claim 1 wherein
 a. said base member is generally U-shaped in elevation and has aligned first and second sockets of different widths,
 b. said yoke being positioned in the wider of said sockets and also being U-shaped in elevation with a socket therein aligned with the narrower of said sockets, and
 c. said support member being positioned in said yoke socket and said narrower socket.
9. The work rest of claim 1 wherein
 a. said base member is slidably mounted on a guide, and
 b. said base member includes a clamp for locking the same in an adjusted position on said guide.
10. The work rest of claim 1 wherein
 a. said work rest is particularly adapted for use in part of a grinding machine with said work shoe opening upwardly and generally towards a grinding wheel of said grinding machine and in opposition to the direction of rotation of said grinding wheel.
11. A grinding machine having
 a. a grinding wheel movable toward a workpiece for a grinding operation,
 b. a support,
 c. a work rest having a base member,
 d. means for clamping said base member to said support,
 e. a yoke member pivotably mounted on said base member by means of a straight yoke shaft,
 f. a work support member secured to said yoke by means of a rear shaft having an eccentric portion,
 g. means for securing said work support member on said base by means of an inner shaft having an eccentric portion,
 h. said work support member includes a work shoe to support the workpiece diameter.
12. The work rest of claim 11 wherein
 a. means are provided to pivot the work support member on the yoke shaft when the inner eccentric shaft is adjusted to selectively advance and retract the work support member horizontally to obtain a solid contact between the workshoe and the workpiece,
 b. and means are provided to pivot the work support member on the inner eccentric shaft when the rear eccentric shaft is selectively adjusted to raise and lower the work support relative to the workpiece.
13. The work rest of claim 1 together with
 a. an upper shoe mechanism including
 b. a cradle overlying said base member,
 c. first and second support links pivotally mounting said cradle on said base member for generally forwardly and rearwardly swinging movement, d. an upper shoe carried by said cradle for cooperation with said workshoe in generally opposed relation thereto, e. And positioning means for shifting said cradle and said upper shoe between operative and retracted positions.

14. The work rest of claim 13 wherein said positioning means are of the manually actuated type and includes an overcenter locking-type linkage.

15. The work rest of claim 13 wherein said positioning means are of the fluid motor-actuated type.

16. The work rest of claim 13 wherein a. a shoe support is pivotally carried by said cradle for limited movement, b. said upper shoe is mounted on one end of said shoe support, and c. a resilient connection is provided between the other end of said shoe support and said cradle whereby resilient pressure contact between said upper shoe and a workpiece is effected.

17. The work rest of claim 13 wherein a. one of said support links is mounted on said first pivot, and b. the other of said support links is mounted on said third pivot.

18. The work rest of claim 13 wherein a. said positioning means includes a fluid motor, and b. said fluid motor is connected to said first support link.

19. The work rest of claim 13 wherein a. said positioning means are of the overcenter locking linkage type and includes b. a third link pivotally connected to said cradle, c. a fourth link pivotally connected to said base member, and d. a pivotal connection between said third and fourth links.

20. The work rest of claim 19 together with a. an abutment surface on said base member, and b. an adjustable stop on said second support link engageable with said abutment surface to limit the swinging movement of said cradle toward an operative position for said upper shoe.

21. The work rest of claim 13 wherein a. said positioning means are of the overcenter locking linkage type and includes b. a third link pivotally connected to said cradle, c. a fourth link pivotally connected to said base member, d. a pivotal connection between said third and fourth links, and e. a handle carried by said third link and projecting above said cradle for ready access.

22. The work rest of claim 13 wherein a. said positioning means are of the overcenter locking linkage type and includes b. a third link pivotally connected to said cradle, c. a fourth link pivotally connected to said base member, d. a pivotal connection between said third and fourth links, and e. a spray guard secured to said third link for movement between operative and retracted positions therewith together with said upper shoe.

23. The work rest of claim 13 wherein a. said positioning means are of the overcenter locking linkage type and includes b. a third link pivotally connected to said cradle, c. a fourth link pivotally connected to said base member, d. a pivotal connection between said third and fourth links, and e. a spray guard secured to said third link for movement between operative and retracted positions therewith together with said upper shoe, f. said spray guard extending across said cradle and projecting to opposite sides of said work rest.

24. The work rest of claim 13 together with a. a spray guard mounted for movement with said cradle between operative and retracted positions, b. said spray guard extending across said cradle and projecting to opposite side thereof.

25. A work rest for a machine tool, said work rest comprising a. a base member, b. a lower work shoe adjustable carried by said base member and c. an upper shoe mechanism including d. a cradle overlying said base member, e. first and second support links pivotally mounting said cradle on said base member for generally forwardly and rearwardly swinging movement, f. an upper show carried by said cradle for cooperation with said workshoe in generally opposed relation thereto, g. and positioning means for shifting said cradle and said upper shoe between operative and retracted positions.

26. The work rest of claim 25 wherein a. a shoe support is pivotally carried by said cradle for limited movement.

b. said upper shoe is mounted on one end of said shoe support, and c. a resilient connection is provided between the other end of said shoe support and said cradle whereby resilient pressure contact between said upper shoe and a workpiece is effected.

27. The work rest of claim 25 wherein a. said positioning means are of the overcenter locking linkage type and includes b. a first link pivotally connected to said cradle, c. a second link pivotally connnected to said base member, and d. a pivotal connection between said first and second links.

28. The work rest of claim 25 wherein a. said positioning means are of the overcenter locking linkage type and includes b. a first link pivotally connected to said cradle, c. a second link pivotally connected to said base member, d. a pivotal connection between said first and second links, and e. a spray guard secured to said first link for movement between operative and retracted positions therewith together with said upper shoe.

29. The work rest of claim 25 together with a. a spray guard mounted for movement with said cradle between operative and retracted positions, b. said spray guard extending across said cradle and projecting to opposite sides thereof. 78 upwardly as far as is permitted by the fastener 84, thereby urging the upper shoe 82 downwardly. It will be readily apparent that the upper shoe 82 is upwardly movable a limited about through the pivoting of the shoe support 78 and the compressing of the spring 85.

The cradle 71, the carrier 80 and the upper shoe 82 carried thereby are manually movable between retracted and operative positions and are locked in the operative position thereof by means of an overcenter linkage which is generally identified by the numeral 86. The linkage 86 includes a link 87 disposed on each side of the work rest 14 and pivotally mounted on an extension of the pivot shaft 77. The overcenter linkage 86 at each side of the work rest 14 also includes a lower link 88 which is mounted on a pivot 89 carried by the front portion 20 of the base member 15. At this time, it is pointed out that outer surface parts of the front portion 20 are cut away, as at 90, to provide clearance for the links 88.

The links 87 and 88 at each side of the work rest 14 are connected together by a pivot pin 91. It will be seen from FIG. 8 that when the cradle 71 is brought to a generally horizontal position with the upper shoe 82 in pressure contact with the workpiece W, the pivots 77, 89 and 91 will assume an in-line relationship. However, in order to lock the cradle 71 in its operative position, the pivot pin 91 at each side of the work rest 14 is swung above the line extending between the pivots 77 and 89 so that the links 87 and 88 move to an overcenter position.

In order that the movement of the links 87 and 88 to their overcenter positions may be limited, a stop member 92 is mounted on each side of the cradle 71 for engaging the links 87. Thus, it will be readily apparent that when the cradle 71 is brought to its operative position by a snap action which brings the links 87 and 88 and the pivots 91 to their overcenter positions, the cradle 71 will be locked in place since considerable force is required to move the links 87 and 88 back past their overcenter positions and they cannot move further beyond their overcenter positions due to the engagement of the links 87 with the stop members 92.

In order to facilitate the positioning of the cradle 71 and the upper shoe 82, the links 87 are generally L-shaped in outline and include upper extensions 93 between which a handle 94 is positioned. The handle 94 is secured in place by means of suitable fasteners 95. It will be readily apparent that since the handle 94 is directly coupled to the links 87, the handle 94 may be utilized in swinging the links 87 and 88 from their folded relationship of FIG. 9 to their slightly overcenter relationship of FIG. 8 so as to move the cradle 71 and the upper shoe 82 from their retracted position to their operative position.

It is a further pointed out that the links or pivot arms 76 include conventional means to limit the movement of the cradle 71 to the right, as viewed in FIG. 9. These means include an adjustable stop screw 96 which extends through a lower extension of each link 76 and which is engaged with an abutment surface 97 which exists between the portions 20 and 21 of the base member 15. The screw 96 is locked in adjusted position by means of a locknut 98.

OPERATION OF MANUALLY OPERATED MECHANISM

It will be readily apparent from FIGS. 8 and 9 that movement of the upper shoe mechanism 70 is effected by moving the handle 94 clockwise. The pivot arms 76 will pivot about the eccentric shaft 35 while the cradle support 73 will pivot about the pivot shaft 25. The cradle 71, the shoe support 78 and the upper shoe 82 will be advanced as a unit about an arc controlled by the cradle support 73 and the pivot arms 76 until the pivot arms 76 reach a solid stop against the base member 15. The handle 94 is pivoted until the links 87 reach a solid stop against the stop members 92 at which time the links 87 and 88 are in offcenter toggle relation to lock the handle 94 in its most advanced position in a clockwise direction.

The upper shoe mechanism 70 is retracted by counterclockwise movement of the handle 94. The links 88 are pivoted clockwise about the pivot pins 89 and the pivot arms 76 are pivoted counterclockwise about the eccentric shaft 35 to effect movement of the cradle 71, the shoe support 78 and the upper shoe 82, to the left which pivots the cradle support 73 counterclockwise to the position shown in FIG. 9. Counterclockwise movement of the handle 94 is continued until the pivot arms 76 contact the links 88. This movement permits ample space to remove the workpiece W from the work rest 14.

SPRAY GUARD

It has been found desirable to provide a spray guard for the work rest 14. The purpose of the spray guard is to protect the operator from the coolant spray during the grinding operation by confining the spray from the coolant to a small area. The spray guard is generally identified by the numeral 100 and is actually formed in three pieces.

the spray guard 100 includes a central portion 101 which is mounted within the handle 94 and extends down around the shoe support 78 to a position closely overlying the cradle 71.

The spray guard 100 also includes two outer sections, each of which is carried by one of the links 87. The spray guard outer sections are each identified by the numeral 102 and includes an upper portion 103 which is disposed just to the right of the handle 94 (FIG. 8) and terminates in a downwardly turned upper curl 104. A lower portion 105 of the outer spray guard sections 102 is integrally connected to the upper portion 103 and extends generally alongside the lower edge of the associated link 87. The lower portion 105 terminates in a lower curl 106.

It is to be noted that the outer sections 102 of the spray guard are secured as by welding to a mounting plate 107 which, in turn, is removably secured to the associated link 87 by means of fasteners 108. The outer spray guard sections 102 may extend in cantilever relation from the links 87.

As is best shown in FIG. 9, inasmuch as the spray guard 100 is carried by the handle 94 and the links 87 to which the handle 94 is secured, when the upper shoe mechanism 70 is moved to a retracted position, the spray guard 100 is also moved to a retracted position relative to a workpiece W so as to facilitate the removal of the workpiece.

HYDRAULICALLY OPERATED MECHANISM

Referring now to FIG. 10 in particular, it will be seen that the work rest 14 has been modified to include a hydraulically operated upper shoe mechanism which is generally referred to by the numeral 110. The construction of the upper shoe mechanism 110 is basically the same as that of the upper shoe mechanism 70 and includes a cradle 111 which overlies the base member 15, the yoke 24 and the support member 34 in its operative position. The front end of the cradle 111 is supported by a pair of support arms or links 112 which are disposed on opposite sides of the base member 15 and are pivotally mounted on extensions of the pivot shaft 25. The upper ends of the support arms 112 are pivotally connected to the left end of the cradle 111 by means of a pivot shaft 113.

The rear end of the cradle 111 is supported by a pair of support arms or links 114 which are disposed on opposite sides of the portion 21 of the base member 15 and have their lower ends pivotally mounted on extensions of the eccentric shaft 35. The links 114 are angular in outline and have their lower ends pivotally mounted on extensions of the eccentric shaft 35. The links 114 are angular in outline and have their upper ends pivotally connected to opposite sides of the cradle 111 by means of a pivot shaft 115. At this time it is pointed out that upper parts of the portion 20 of the base member 15 are cut away to provide clearance for the links 114. In the same manner, parts of the underside of the cradle 111 are cut away to provide clearance for both the base member 15 and the yoke 24.

The cradle 111 has mounted thereon the shoe support 78 with the shoe support being pivotally mounted on the pivot shaft 115. The upper shoe 82 is carried by the carrier 80 and secured to the shoe support 78 in the manner described with respect to the manually operated mechanism.

In lieu of being manually movable between its operative position of FIG. 10 and a retracted position (not shown) the upper shoe mechanism 110 is hydraulically operated. To this end, there is provided a hydraulic cylinder 116 which is disposed alongside the table 11 and is mounted by means of trunnions 117 from a support bracket 118. The hydraulic cylinder 116 includes a piston rod 120 which is provided at the free end thereof with a fitting 121. The fitting 121, in turn, carries a pivot pin 122 which is utilized to connect the piston rod 120 to the support links 112 to effect the pivoting thereof about the axis of the pivot shaft 25.

It is pointed out that the work rest 14 is adjustable on the table 11 for alignment of the shoes 56 and 82 with a workpiece journal. To this end, the hydraulic cylinder 116 must also be adjustably mounted. It is to be understood that it is adjustable within limits relative to the support bracket 118. Furthermore, the support bracket 118 may be adjustably secured to the table 11 in any desired manner. For example, the support bracket 118 may be secured to the table 11 by a plurality of bolts (not shown) which are selectively positioned in threaded bores formed in the table 11. On the other hand, the sides of the table 11 could be provided with a T-slot to facilitate the adjustable mounting of the mounting bracket 118. In view of the fact that the specific attachment of the mounting bracket 118 to the table 11 is not an inventive part of the mechanism, no attempt will be made to further describe the adjustable mounting thereof.

Movement of the upper shoe mechanism 110 to its operative position is effected when hydraulic pressure is directed to the head end of the hydraulic cylinder or motor 116. The piston rod 120 projects from the cylinder and pivots the support arms or links 112 in a clockwise direction to both advance and tilt the cradle 111 and the shoe support 78 until the upper shoe 82 engages and clamps the workpiece W against the lower work shoe 56.

The workpiece W remains clamped between the shoes 56 and 82 until hydraulic pressure is directed to the rod end of the cylinder 116 which lowers or retracts the piston rod 120, thereby effecting the counterclockwise swinging of the support arms 112. The counterclockwise movement of the support arms 112 retracts the cradle 111, the shoe support 78 and the upper shoe 82.

It is also pointed out at this time that although no spray guard has been illustrated in conjunction with the hydraulically operated upper shoe mechanism, a spray guard similar to the spray guard 100 may be provided. Such a spray guard may be conveniently mounted on the arms 114 for swinging movement between operative and inoperative positions in a manner similar to that described with respect to the spray guard 100.

OPERATION OF HYDRAULICALLY OPERATED MECHANISM

With particular reference to FIGS. 10 and 11, it is to be understood that the upper shoe mechanism 110 may be operated either automatically or by manual pushbutton controls.

During the automatic operation, limit switch 9LS is closed when the tailstock (not shown) of the grinding machine is completely advanced to energize timer relay 3TR. Contact 3TR1 closes after a timed interval to complete a circuit through contact 1CRA, which is closed when the operation is set for the automatic cycle, and normally closed contact 63CR1 to energize the work rest relay 25CR. Contact 25CR1 closes together with contact 25CR2 which closes to energize the work rest solenoid 5HB SOL.

It is to be noted that the hydraulic system for the cylinder 116 includes a supply tank 125 having connected thereto a return line 126 and a supply line 127 which, in turn, is connected to a pump 128. The pump 128 delivers pneumatic or hydraulic fluid under pressure through a filter 130 incorporated in a line 131. The lines 126 and 131 are connected to a two-position valve 132.

The hydraulic system also includes a line 133 which is coupled to the head end of the cylinder 116 and to the valve 132. A line 134 extends between the rod end of the cylinder 116 and the valve 132.

The valve 132 is spring loaded to the left in which position the pump 128 is normally connected to the rod end of the cylinder 116 retaining the upper shoe mechanism 110 in a retracted position. When the solenoid 5HB SOL is energized, the valve 132 is shifted to the right, connecting the pump 128 to the head end of the cylinder 116 and effecting the advance of the piston rod 120 to pivot the support arms 112 and links 114 in a clockwise direction to position the cradle 111 and the shoe support 78 so that the upper shoe 82 is resiliently forced and held against the workpiece W by hydraulic pressure.

It is to be noted that when the hydraulic cylinder 116 is actuated, fluid from the rod end of the hydraulic cylinder 116 is directed by means of the line 134 through the valve 132 and back through the return line 126 to the tank 125.

The workpiece W remains clamped between the shoes 56 and 82 until the grinding cycle is completed at which time a limit switch (not shown) is closed to energize end of cycle relay 63CR (not shown). The normally closed contact 63CR1 now opens to deenergize relay 25CR. Contact 25CR2 opens to deenergize solenoid 5HB SOL with the result that the valve 132 is again shifted to the left by the spring thereof and hydraulic fluid is directed through the line 134 to the rod end of the hydraulic cylinder 116. The piston rod 120 is then lowered or retracted to pivot the arms 112 and links 114 in a counterclockwise direction to retract the cradle 111, shoe support 78 and upper shoe 82 away from the workpiece.

The hydraulic operation of the upper shoe mechanism 110 is duplicated during the manual operation thereof when the cycle is effected by depressing pushbutton PB20 to complete a circuit through contact CHR1, which is closed by manual cycle operation, to energize relay 25CR. Contact 25CR2 closes to energize work rest solenoid 5HB SOL which shifts valve 132 to the right to effect the positioning of the upper shoe 82 against the workpiece in the previously discussed manner.

At this time it is pointed out that when relay 25CR is energized, a holding circuit is completed through contact CHR1, pushbutton PB21 and contact 25CR1 to keep relay 25CR energized when pushbutton PB20 is released. It is also to be understood that pushbutton PB21 is normally closed.

When it is desired to retract the upper shoe 82 to remove a workpiece, pushbutton PB21 is depressed, opening the circuit to relay 25CR. When relay 25CR is deenergized, contact 25CR2 opens to deenergize the solenoid 5HB SOL, permitting the valve 132 to return to its normal position wherein the piston rod 120 is retracted to retract the cradle 111.

Although only preferred embodiments of the work rest have been specifically illustrated and described herein, it is to be understood that other minor modifications may be made in the work rest structure without departing from the spirit of the invention.

I claim:
1. A work rest for machine tool, said work rest comprising
   a. a base member, a yoke,
   b. a first pivot pivotally connected said yoke to said base member,
   c. a support member,
   d. second and third pivots connecting said support member to said yoke and to said base member, respectively,
   e. a work shoe carried by said support member,
   f. and at least one of said pivots being adjustable to effect a controlled shifting of said support member relative to said base member for positioning said work shoe.
2. The work rest of claim 1 wherein
   a. said at least one adjustable pivot is of the eccentric type.
3. The work rest of claim 1 wherein
   a. said at least one adjustable pivot is of the eccentric type,
   b. and means for selectively rotationally positioning said at least one adjustable pivot including,
   c. a pair of counter-acting screws in radial offcenter engagement with said at least one adjustable pivot.
4. The work rest of claim 1 wherein
   a. two of said pivots are adjustable,
   b. one of said adjustable pivots effecting primarily horizontal movement of said work shoe, and
   c. the other of said adjustable pivots effecting primarily vertical movement of said work shoe.
5. The work rest of claim 1 wherein
   a. two of said pivots are adjustable,
   b. one of said adjustable pivots effecting primarily horizontal movement of said work shoe, and
   c. the other of said adjustable pivots effecting primarily vertical movement of said work shoe,
   d. said one adjustable pivot being displaced primarily horizontally with respect to the third pivot of said three pivots, and
   e. said other adjustable pivot being displaced primarily vertically with respect to said third pivot.
6. The work rest of claim 5 wherein
   a. said one adjustable pivot is said pivot between said support member and said base member, and
   b. said other adjustable pivot is said pivot between said support member and said yoke.
7. The work rest of claim 1 wherein
   a. said work rest is particularly adapted to support a rotating workpiece, and b. said work shoe includes angularly spaced end portions which are raised and curved to support the workpiece and are replaceable in accordance with the workpiece contour to properly support a workpiece.

8. The work rest of claim 1 wherein
a. said base member is generally U-shaped in elevation and has aligned first and second sockets of different widths,
b. said yoke being positioned in the wider of said sockets and also being U-shaped in elevation with a socket therein aligned with the narrower of said sockets, and
c. said support member being positioned in said yoke socket and said narrower socket.

9. The work rest of claim 1 wherein
a. said base member is slidably mounted on a guide, and
b. said base member includes a clamp for locking the same in an adjusted position on said guide.

10. The work rest of claim 1 wherein
a. said work rest is particularly adapted for use in part of a grinding machine with said work shoe opening upwardly and generally towards a grinding wheel of said grinding machine and in opposition to the direction of rotation of said grinding wheel.

11. A grinding machine having
a. a grinding wheel movable toward a workpiece for a grinding operation,
b. a support,
c. a work rest having a base member,
d. means for clamping said base member to said support,
e. a yoke member pivotably mounted on said base member by means of a straight yoke shaft,
f. a work support member secured to said yoke by means of a rear shaft having an eccentric portion,
g. means for securing said work support member on said base by means of an inner shaft having an eccentric portion,
h. said work support member includes a work shoe to support the workpiece diameter.

12. The work rest of claim 11 wherein
a. means are provided to pivot the work support member on the yoke shaft when the inner eccentric shaft is adjusted to selectively advance and retract the work support member horizontally to obtain a solid contact between the workshoe and the workpiece,
b. and means are provided to pivot the work support member on the inner eccentric shaft when the rear eccentric shaft is selectively adjusted to raise and lower the work support relative to the workpiece.

13. The work rest of claim 1 together with
a. an upper shoe mechanism including
b. a cradle overlying said base member,
c. first and second support links pivotally mounting said cradle on said base member for generally forwardly and rearwardly swinging movement,
d. an upper shoe carried by said cradle for cooperation with said workshoe in generally opposed relation thereto,
e. and positioning means for shifting said cradle and said upper shoe between operative and retracted positions.

14. The work rest of claim 13 wherein said positioning means are of the manually actuated type and includes an overcenter locking-type linkage.

15. The work rest of claim 13 wherein said positioning means are of the fluid motor-actuated type.

16. The work rest of claim 13 wherein
a. a shoe support is pivotally carried by said cradle for limited movement,
b. said upper shoe is mounted on one end of said shoe support, and
c. a resilient connection is provided between the other end of said shoe support and said cradle whereby resilient pressure contact between said upper shoe and a workpiece is effected.

17. The work rest of claim 13 wherein
a. one of said support links is mounted on said first pivot, and b. the other of said support links is mounted on said third pivot.

18. The work rest of claim 13 wherein
a. said positioning means includes a fluid motor, and
b. said fluid motor is connected to said first support link.

19. The work rest of claim 13 wherein
a. said positioning means are of the overcenter locking linkage type and includes
b. a third link pivotally connected to said cradle,
c. a fourth link pivotally connected to said base member, and
d. a pivotal connection between said third and fourth links.

20. The work rest of claim 19 together with
a. an abutment surface on said base member, and
b. an adjustable stop on said second support link engageable with said abutment surface to limit the swinging movement of said cradle toward an operative position for said upper shoe.

21. The work rest of claim 13 wherein
a. said positioning means are of the overcenter locking linkage type and includes
b. a third link pivotally connected to said cradle,
c. a fourth link pivotally connected to said base member,
d. a pivotal connection between said third and fourth links, and
e. a handle carried by said third link and projecting above said cradle for ready access.

22. The work rest of claim 13 wherein
a. said positioning means are of the overcenter locking linkage type and includes
b. a third link pivotally connected to said cradle,
c. a fourth link pivotally connected to said base member,
d. a pivotal connection between said third and fourth links, and
e. a spray guard secured to said third link for movement between operative and retracted positions therewith together with said upper shoe.

23. The work rest of claim 13 wherein
a. said positioning means are of the overcenter locking linkage type and includes
b. a third link pivotally connected to said cradle,
c. a fourth link pivotally connected to said base member,
d. a pivotal connection between said third and fourth links, and
e. a spray guard secured to said third link for movement between operative and retracted positions therewith together with said upper shoe,
f. said spray guard extending across said cradle and projecting to opposite sides of said work rest.

24. The work rest of claim 13 together with
a. a spray guard mounted for movement with said cradle between operative and retracted positions,
b. said spray guard extending across said cradle and projecting to opposite sides thereof.

25. A work rest for a machine tool, said work rest comprising
a. a base member,
b. a lower work shoe adjustably carried by said base member and
c. an upper shoe mechanism including
d. a cradle overlying said base member,
e. first and second support links pivotally mounting said cradle on said base member for generally forwardly and rearwardly swinging movement,
f. an upper shoe carried by said cradle for cooperation with said workshoe in generally opposed relation thereto,
g. and positioning means for shifting said cradle and said upper shoe between operative and retracted positions.

26. The work rest of claim 25 wherein
a. a shoe support is pivotally carried by said cradle for limited movement.
b. said upper shoe is mounted on one end of said shoe support, and c. a resilient connection is provided between the other end of said shoe support and said cradle whereby resilient pressure contact between said upper shoe and a workpiece is effected.

27. The work rest of claim 25 wherein
 a. said positioning means are of the overcenter locking linkage type and includes
 b. a first link pivotally connected to said cradle,
 c. a second link pivotally connected to said base member, and
 d. a pivotal connection between said first and second links.

28. The work rest of claim 25 wherein
 a. said positioning means are of the overcenter locking linkage type and includes
 b. a first link pivotally connected to said cradle,
 c. a second link pivotally connected to said base member,
 d. a pivotal connection between said first an second links, and
 e. a spray guard secured to said first link for movement between operative and retracted positions therewith together with said upper shoe.

29. The work rest of claim 25 together with
 a. a spray guard mounted for movement with said cradle between operative and retracted positions,
 b. said spray guard extending across said cradle and projecting to opposite sides thereof.

UNITED STATES PATENT OFFICE
CERTIFICATE OF CORRECTION

Patent No. 3,591,988   Dated July 13, 1971

Inventor(s) Ralph E. Price

It is certified that error appears in the above-identified patent and that said Letters Patent are hereby corrected as shown below:

The cover sheet and Columns 1 through 20 should read as shown on the attached sheets.

Signed and sealed this 6th day of November 1973.

(SEAL)
Attest:

EDWARD M. FLETCHER, JR.           RENE D. TEGTMEYER
Attesting Officer                 Acting Commissioner of Patents